US005373380A

United States Patent [19]

Harada et al.

[11] Patent Number: 5,373,380

[45] **Date of Patent: * Dec. 13, 1994**

[54] FERROELECTRIC LIQUID CRYSTAL DISPLAY WITH LIQUID CRYSTAL MIXTURES HAVING HIGH SPONTANEOUS POLARIZATION AND SHORT HELICAL PITCH AND ALIGNMENT LAYERS CONTAINING LIPOPHILIC OR AMPHIPHILIC COMPOUNDS

[75] Inventors: Takamasa Harada, Chiba, Japan; Claus Escher, Hofheim, Germany; Gerd Illian, Tokyo, Japan; Anke Kaltbeitzel, Rüselsheim; Norbert Rösch, Frankfurt am Main, both of Germany

[73] Assignee: Hoechst Aktiengesellschaft, Frankfurt am Main, Germany

[ * ] Notice: The portion of the term of this patent subsequent to Jul. 26, 2011 has been disclaimed.

[21] Appl. No.: 47,815

[22] Filed: Apr. 15, 1993

[30] Foreign Application Priority Data

Apr. 20, 1992 [JP] Japan .................................. 4-144735

[51] Int. Cl.$^5$ .............................................. G02F 1/1337

[52] U.S. Cl. ....................................... 359/75; 359/100; 252/299.4

[58] Field of Search ................. 359/100, 104, 75, 103; 252/299.1, 299.6, 299.4

[56] References Cited

U.S. PATENT DOCUMENTS 5,135,678 8/1992 Murata et al. ...................... 359/103

FOREIGN PATENT DOCUMENTS 0404081 12/1990 European Pat. Off. .
0451820 10/1991 European Pat. Off. .
0451822 10/1991 European Pat. Off. .
0453966 10/1991 European Pat. Off. .
WO92/13290 8/1992 WIPO .

OTHER PUBLICATIONS

English Language specification identified by file number HOE 91/F 009 (which relates to WO92/13290 previously submitted).
HOE 90/F 120 specification (which relates to EP 0,453,966).
HOE 90/F 115 specification (which relates to EP 0, 451,822).
HOE 90/F 117 specification (which relates to EP 0,451,820).
HOE 89/F 377K specification (which also relates to EP 0,404,081).

*Primary Examiner*—William L. Sikes
*Assistant Examiner*—Huy Mai
*Attorney, Agent, or Firm*—Curtis, Morris & Safford

[57] ABSTRACT

Ferroelectric liquid crystal display comprising outer substrates, electrodes, polarizer(s), ferroelectric liquid crystalline material and alignment layer(s), in which the ferroelectric liquid crystalline material has a spontaneous polarization of Ps>20 nC.cm$^{-2}$ and a natural helical pitch of less than half of the cell thickness, and the alignment layer comprises at least one lipophilizing, lipophilic and/or amphiphilic compound. The liquid crystal display according to the invention exhibits a short switching time and a significantly reduced surface memory effect, and thus achieves an improved display contrast.

6 Claims, No Drawings

FERROELECTRIC LIQUID CRYSTAL DISPLAY WITH LIQUID CRYSTAL MIXTURES HAVING HIGH SPONTANEOUS POLARIZATION AND SHORT HELICAL PITCH AND ALIGNMENT LAYERS CONTAINING LIPOPHILIC OR AMPHIPHILIC COMPOUNDS

BACKGROUND OF THE INVENTION

The present invention relates to liquid crystal displays using ferroelectric liquid crystal (FLC) mixtures. More precisely, the present invention relates to liquid crystal displays which contain FLC mixtures having a high spontaneous polarization and a short helical pitch and an alignment layer containing lipophilizing or lipophilic compounds (referred to as lipophilic compounds hereinafter), or amphiphilic compounds.

Switching and display devices containing ferroelectric liquid-crystal mixtures (FLC displays) are known, for example, from EP-B 0 032 362 (=U.S. Pat. No. 4,367,924). Liquid-crystal light valves are devices which, for example as a consequence of electrical actuation, modify their optical transmission properties in such a manner that incident light (which may be reflected again) is modulated in intensity. Examples are conventional watch and calculator displays or liquid-crystal displays in the OA (office automation) or TV sectors. However, these also include light shutters as are employed in photocopiers, printers, welding goggles, polarized spectacles for 3D viewing, etc. Spatial light modulators are also applications for liquid-crystalline light valves (see also Liquid Crystal Device Handbook, Nikkan Kogyo Shimbun, Tokyo, 1989; ISBN 4-52602590-9C 3054 and the papers cited therein)

Electro-optical switching and display elements are constructed in such a manner that a liquid-crystal layer is surrounded on both sides by layers which are usually, in this sequence starting from the FLC layer, at least one alignment layer, electrodes and an outer plate (for example made of glass). In addition, they contain one polarizer if they are operated in "guest-host" or in reflective mode, or two polarizers if transmissive birefringence mode is used. The switching and displays elements may also contain further auxiliary layers, such as, for example, diffusion barrier or insulation layers.

The alignment layers, which comprise organic (for example polyimide, polyamide or polyvinyl alcohol) or inorganic (for example SiO) materials, bring, together with a spacing between the outer plates which is chosen to be sufficiently small, the FLC molecules of the FLC mixture into a configuration in which the molecules are arranged with their longitudinal axes parallel to one another and the smectic planes are disposed perpendicular or obliquely to the orientation layer. In this arrangement, as is known, the molecules have two equivalent orientations, between which they can be switched by pulsed application of an electric field, i.e. FLC displays can be switched in a bistable manner and the switching times are in the μs range, these being inversely proportional to the spontaneous polarization of the FLC mixture.

The essential advantage of such FLC displays as compared with the LC displays which can still todate essentially be encountered in industrial practice is considered to be the attainable multiplex ration, i.e. the maximum number of lines which can be driven in the time-sequential process ("multiplex" process), which is significantly larger in the case of FLC displays.

The electrical drive is essentially based on the above-described pulsed addressing, which has been described by way of example in SID 85 DIGEST p. 131 (1985). In FLC displays, the smectic C* phase of the liquid-crystalline material is preferred due to its comparatively low viscosity and therefore short switching time.

In the case of the hitherto known FLC displays, the starting point is, on a controlled basis, that the spacing of the boundary plates is chosen in such a manner that the development of the twist ("helix") typical of ferroelectric phases is suppressed. This takes place in such a manner that—see the initially cited EP-B- the spacing of the plates is smaller than approximately five times the natural helical pitch. However, on account of the optical switching behaviour and for general technological reasons, there is virtually no possibility of setting the spacing of the plates to be arbitrarily small, so that in practice a spacing of approximately 2 μm is adopted. For this reason, efforts were hitherto made to develop FLC mixtures having the greatest possible helical pitch; this has also recently been made subject to further demands (Gray et al., Thermotropic Liquid Crystals, 1987) according to which the spacing of the plates should be less than one quarter of the helical pitch. Examples of FLC mixtures having a high spontaneous polarization and short helical pitch are also described in JP-A 38623/91.

In order to achieve a short switching time, it is required to develop FLC mixtures having a high spontaneous polarization, because as mentioned above, switching times are inversely proportional to the value of the spontaneous polarization of the FLC mixture. It is also required to develop switching and display devices which can significantly reduce a surface memory effect and achieve a greater display contrast.

Accordingly, the object of the present invention is to provide FLC mixtures which exhibit a very low surface memory effect despite of a high spontaneous polarization. Another object of the present invention is to provide ferroelectric liquid crystal displays of improved brightness, improved contrast and improved switching time by using the above mentioned FLC mixture.

SUMMARY OF THE INVENTION

The present invention relates to a ferroelectric liquid crystal display comprising outer substrates, of which at least one is transparent, electrodes, of which at least one is transparent, polarizer(s), ferroelectric liquid crystalline material and alignment layer(s). The display of the invention, in which the liquid crystalline material has a spontaneous polarization of $Ps>20$ $nC.cm^{-2}$ and a natural helical pitch of less than half of the cell thickness, and in which the alignment layer comprises at least one lipophilizing, lipophilic and for amphililic compound, exhibits a short switching time and a greater contrast. Displays in which the ferroelectric liquid crystalline material has helical pitch of less than 1 μm are included in the invention. Furthermore, liphophilic or amphiphilic compounds can be added to the FLC mixture, resulting in a more improved display.

To demonstrate the object of the invention more clearly, general properties of FLC displays are described below.

Particularly important functional parameters of an FLC display are (a) the maximum brightness (transmission in the bright state), (b) the maximum contrast (ratio between the maximum transmission in the bright state and the maximum transmission in the dark state), (c) the image generation rate (or, alternatively, the addressing rate of a pixel).

The brightness (or bright transmission), the contrast and switching time of FLC displays are described below in greater detail.

(a) the maximum transmission in the bright state (bright)is described, as is known, for FLC displays to a good approximation by the equation(1):

$$T\ (\text{bright})=\sin^2(\pi\Delta nd/\lambda)\cdot\sin^2\cdot(4\theta\text{eff})$$

where $\Delta n$=difference between the refractive indices (monoaxial approximation), d=thickness of the FLC layer, $\lambda$=wavelength in vacuum, $\theta$eff=effective tilt angle.

In the ideal case, T (bright) is 1 (or 100%).

While the first of the two expressions in equation (1) can be optimized relatively easily by matching, $\Delta n$ and d to the wavelength of visible light, the optimization of $\sin^2$ (4 $\theta$eff) through the materials presents difficulties since $\theta$eff is generally very much smaller than 22.5° (the optimum value).

In the so-called "chevron" structure (see, for example, T. Rieker et al., 1986, 11th Int. Liq. Cryst. Conf. (Berkeley, 1986), the materials currently available only, as is known, have angles up to about $\theta$eff=8°, which results in a maximum transmission T(bright) of 0.28 and thus corresponds to a loss of 72% in the light output of the FLC display illumination. An exception with respect to the tilt angle are FLC displays having an alignment layer comprising silicon monoxide (SiO) vapor-deposited at an angle, but this must be applied using a very expensive process.

(b) The contrast is the ratio between the transmission in the bright and dark switching states. Maximum contrast values of from 5 to 10 are currently given for FLC displays. The reason for these values, which are too small for many applications (for example TV), is firstly inadequate transmission in the bright state and excessive residual transmission in the dark state. The residual transmission is easily detectable between crossed polarizers from a blueish liquid-crystal texture. It is found for all FLC materials known hitherto if organic alignment layers, such as, for example, those made of rubbed polimide and polyamide, are used.

Again, SiO vapor-deposited at an angle in an expensive vacuum process is an exception since states with significantly lower transmission in the dark state and much higher contrast values are obtained here, even values of 100 having been claimed.

c) The image generation rate or the picture frequency is given by the number of lines of an FLC display and the time duration of the electrical switching pulse. The shorter the switching pulse width, the faster the image generation. On the other hand, the switching time depends, as far as the materials are concerned, on the spontaneous polarization (P) and the viscosity ($\gamma$) of the FLC material.

Since the values for the rotational viscosity ($\gamma$) cannot be reduced sufficiently, an increase in (P) is a suitable way of shortening switching time. However, this is currently prevented by reverse switching effects—propably caused by ionic impurities—which are also known in the relevant literature by the terms "surface memory effect", "reverse switching", "ghost image" and the like (cf., for example, J. Dijon et al., SID conference, San Diego, 1988, pages 2–249).

The result of the ionic impurities is that an image must be written-in more than once before the previous image disappears completely ("ghost image"). This effect, which considerably restricts the economic potential of FLC displays, is the greater the higher the spontaneous polarization of the FLC material is. DE-A-3 939 697 presents FLC mixtures which, in order to prevent or reduce the "ghost-image effect" in displays, contain, as one component, a complex ligand for ions.

According to the invention, in such FLC displays that have a cell gap (i.e. spacing of the boundary plates) of to 10 μm, and especially of 1.2 to 3 μm, use is made of FLC mixtures which exhibit a high spontaneous polarization of Ps>20nC.cm$^{-2}$, and exhibit a natural a natural helical pitch of less than one half of the layer thickness of the aforementioned FLC displays, in particular of more than 1/10 of this layer thickness.

DESCRIPTION OF THE PREFERRED EMBODIMENTS

In preferred embodiments, the ferroelectric phase is an Sc* phase and the phase sequence of the FLC mixture proceeds as follows:

$$I \rightarrow N^* \rightarrow SA^* \rightarrow Sc^*$$

in this case in the entire temperature range of the N* phase the helical pitch is no less than 8 μm, preferably less than 15 μm. The stated properties (i.e. high spontaneous polarization, a first specified helical pitch in the smectic phase and a second specified helical pitch in the cholesteric phase) are in particular satisfied by non-chiral LC basic mixtures, to which two or more appropriate chiral dopants are added. Expendiently, such chiral dopants contribute to the extent of at least 20% to the spontaneous polarization of the total mixture and possess the same sign in the values of the spontaneous polarization; at the same time, they contribute to the extent of at least 20% to the natural helical pitch in the smectic phase and have an identical sense of rotation in their twist capacity; in the N* phase, two of the chiral dopants do moreover exhibit differing signs (non-identical sense of rotation) in their twist capacity.

The chemical compounds which satisfy the aforementioned conditions in nonchiral LC basic mixtures include, in particular, those of the general formulae (I) and (II)

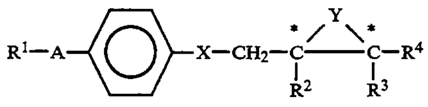
(I)

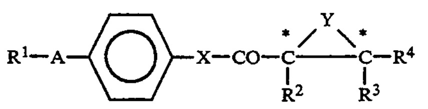
(II)

where the symbols and indices have the following meaning:

$R^1$=straight chain or branched-chain ($C_1$-$C_{12}$)alkyl, in which one or two non-adjacent —$CH_2$—groups may be replaced by —O— and/or —S—;

A=diazin-2,5-diyl or azin-2,5-diyl;

X; Y=O and/or S;

$R^2$, $R^3$, $R^4$=independently of one another H, straight-chain ($C_1$-$C_{10}$) alkyl or branched chain ($C_3$-$C_{10}$) alkyl, in which $R^2$, $R^3$ and $R^4$ are not simultaneouly H.

In particularly preferred embodiments, the following are applicable:

$R^1$=straight-chain ($C_5$-$C_{11}$)alkyl, in which one —$CH_2$-group can be replaced by —O— or —S—.

X, Y=O;

$R^2$, $R^3$=H;

$R^4$=straight-chain or branched-chain ($C_3$-$C_7$)alkyl;

A=pyrimid in-2,5-diyl.

Surprisingly, using the aforementioned FLC mixtured it was even possible to suppress the—in the present case undesired—development of a helix in the ferroelectric phase, if the layer thickness is greater than 10 times the natural helical pitch. Even in FLC mixtures having natural helical pitches of <0.7 μm in the ferroelectric phase, no optical hysteresis occurs at high Ps values; at Ps values of >100 nC.cm$^{-2}$, no "ghost images" were observed any longer. Further advantages of the invention reside in the retention of the short switching times in the possibility of portraying grey gradations.

It has now been found that, inter alia, compounds which render the alignment layer lipophilic or amphiphilic give greatly improved contrast and greater brightness in FLC switching and display elements containing the above mentioned FLC mixtures.

As shown below, the FLC displays according to the invention have such a greater effective tilt angle in the "chevron" structure and thus facilitate very much higher transmission in the bright state and do not require an economically unfavorable vapor-deposition process in their production. As shown below, the FLC displays according to the invention, even based on conventional alignment layers which are inexpensive to produce, for example made of polyimide, polyamide or polyvinyl alcohol, have high contrast values, of a magnitude sufficient even for TV applications.

Display devices of the present invention include displays in which the structure of the smectic layer is a bookshelf geometry or a quasi-bookshelf geometry. These structures may also be formed by an electric field treatment. Display devices in which a tilt angle of the bookshelf geometry or the quasi-bookshelf geometry is less than 10° are also included in the invention.

A variety of compounds, such as macrocyclic compounds and amides described below, can be added as a lipophilic or amphiphilic compounds to the alignment layer of the invention.

More precisely, the lipophilic or amphiphilic compounds added to the alignment layer of the invention are at least one macrocyclic compound of the general formula (III):

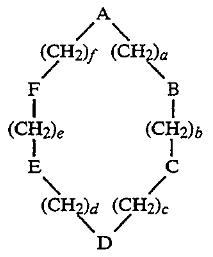

(III)

in which a, b, c, d, e, f, independently of one another, are an integer from zero to 4, a+b+c+d+e being greater than 7, and —A—, —B—, —C—, —D—, —E—, —F—, identical or different, are

—$CH_2$—, —CHR—, —CH=CH—, —CR=CR'—,

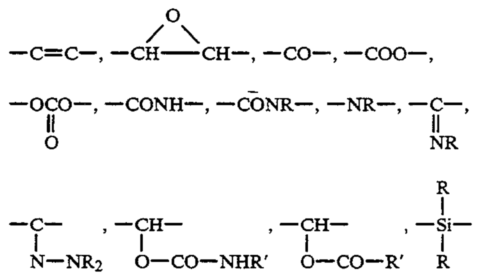

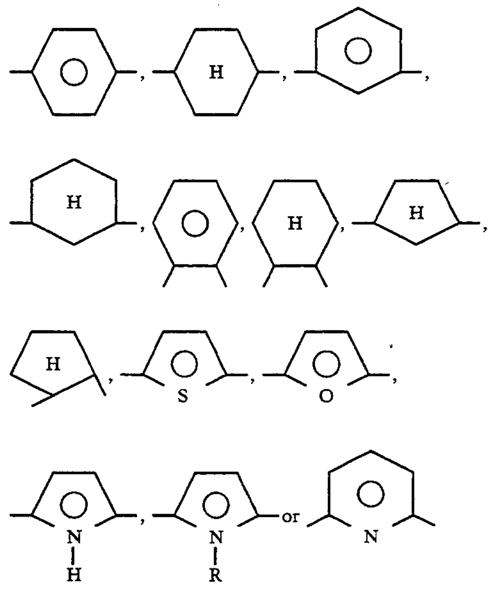

in which

R can be alkyl of 1 to 12 carbon atoms, and

R' can be alkyl of 1 to 12 carbon atoms, in wich are —$CH_2$-group can be replaced by —O—, COO—or —OCO—, phenyl or Cl, F or CN.

Preferably an alignment layer is used containing a macrocyclic compound of the formula (III), in which the symbols have the following meaning:

a, b, c, d, e, f, R, R' are as described above, —B—, —C—, —D—, —E—, —F—, are a —$CH_2$— group and —A—, D—, identical or different, are $-CH_2-$, $-CHR-$, $-CH=CH-$, $-CR=CR'-$,

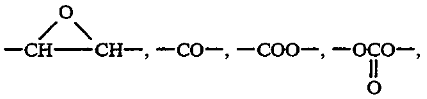

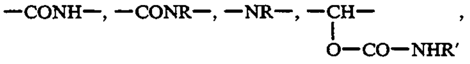

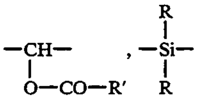

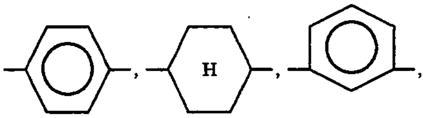

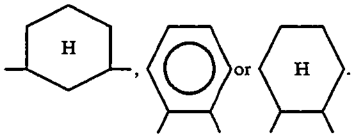

Particularly preferably, macrocyclic compounds according to the formula (III) are used in which the symbols have the following meaning:

a, b, c, d, e, f independently of one another, are an integer from zero to 3,

—B—, —C, —E—, —F— are a $-CH_2-$ group

—A, —D—, identical or different, are

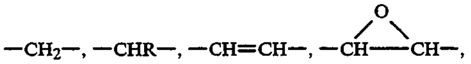

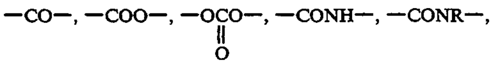

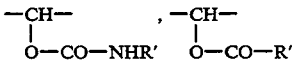

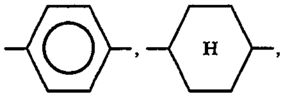

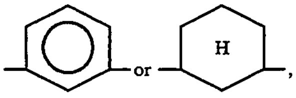

in which

R is alkyl of 1 to 12 carbon atoms and

R' is alkyl of 1 to 12 carbon atoms or phenyl.

Particularly preferably, the groups —A—, —D— have the following meaning:

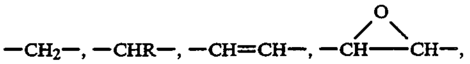

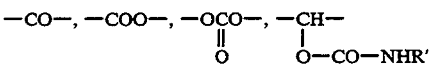 or

-continued

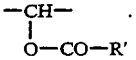

In principle, a wide range of macrocyclic compound—i.e. cyclic compounds of 13 or more members; for restrictions, see, for example, O. A. Neumüller (ed), Römpps Chemie-Lexikon, 8th edition, Frankh'sche Verlagsbuchhandlung, Stuttgart 1989—is suitable for use in alignment layers, but macrocycles of the formula (III) just described are particularly suitable for suppressing twist states. The lipophilic or amphiphilic compounds added to the alignment layer of the invention may also be at least one amide of the general formula (IV), which acts as a ionophore:

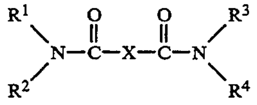 (IV)

in which $R^1$, $R^2$, $R^3$, $R^4$, independently of one another, are alkyl of 1 to 15 carbon atoms, in which one $-CH_2-$ group can be replaced by —COO—, —CO— or —O—, cyclohexyl, phenyl or benzyl, is an alkyl of 2 to 9 carbon atoms, in which one or two non-adjacent $-CH_2-$ groups can be replaced by —O—, in which two adjacent $CH_2$ groups can be replaced by 1,2-phenylene or 1,2-cyclohxylene, in which two adjacent $-CH_2-$ groups can be replaced by $CH(CH_3)-CH(CH_3)-$ and in which hydrogen atom of a $CH_2$ group can be substituted by $R^5$ or $R^6$, in which $R^5$ is alkyl I of 1 to 15 carbon atoms, $R^6$ is alkyl of 1 to 15 carbon atoms or $CH_2-O-CH_2-CO-NR^1R^2$. Preferably, an alignment layer is used which contains an amide of the formula (IV) in which $R^1$, $R^2$, $R^3$, $R^4$, independently of one another, are alkyl of 1 to 15 carbon atoms, in which a $-CH_2-$ group can be replaced by —COO—, —CO— or —O—, cyclohexyl or phenyl, and X is an alkylene of 2 to 9 carbon atoms, in which one or two non-adjacent $-CH_2-$ groups can be replaced by —O—, in which two adjacent $CH_2$ groups can be replaced by 1,2-phenylene or 1,2-cyclohexylene, in which two adjacent $-CH_2-$ groups can be replaced by $CH(CH_3)-CH(CH_3)-$ and in which a hydrogen atom of a $CH_2$ group can be substituted by $R^5$ or $R^6$, in which $R^5$, $R^6$, independently of one another, are alkyl or 1 to 15 carbon atoms.

Amides of the formula (IV)in which $R^1$, $R^2$, $R^3$, $R^4$, independently of one another, are alkyl of 1 to 15 carbon atoms, in which one $-CH_2-$ group can be replaced by —COO—, cyclohexyl and X is an alkylene of 2 to 9 carbon atoms, in which one or two non-adjacent $-CH_2-$ groups can be replaced by —O—, in which two adjacent $CH_2$ groups can be replaced by 1,2-phenylene, and in which two adjacent $CH_2$—groups can be replaced by $CHCH_3)-CH(CH_3)-$ are particularly preferred.

Amides of the formula (IV) in which —X— represents one of the following groups

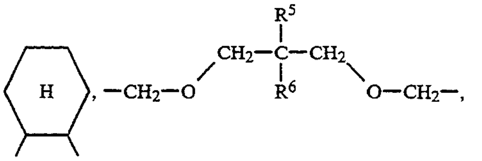

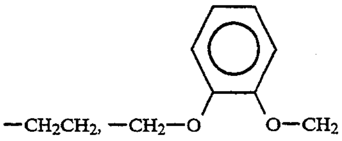

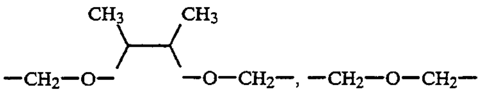

which $R^1$ to $R^6$ have the abovementioned meanings are also particularly preferred.

It is very particularly preferred for —X— to represent the following groups

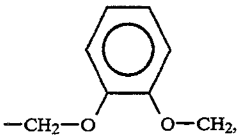

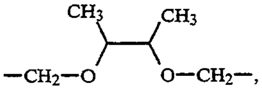

, or

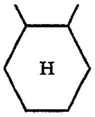

In principle, a wide range of ionophores is suitable for the use in alignment layers, but amides of the formula (IV) just described are particularly suitable for suppressing twist states.

The lipophilic or amiphilic compounds added to the alignment layer of the invention may also be at least one compound of the general formula (V) or (VI):

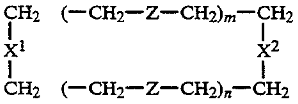

(V)

in which

—Z— is —O— or —S—, m, n are integers greater than zero and $m+n$ is 2 to 6, $-X^1-$, $-X^2-$, identical or different, are

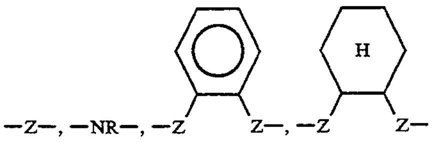

or $-X^1-$, $-X^2-$ together are $<N-CH_2(-CH_2-Z-CH_2)_L-CH_2-N>$ or $<N-CO(CH_2-Z-CH_2)_L-CO-N>$ in which —R is alkyl or alkanoyl of 1 to 15 carbon atoms, -phenyl, -benzyl or -benzoyl;

L is 1 or 2;

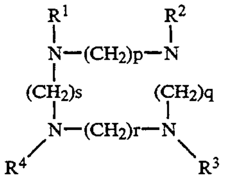

(VI)

in which $-R^1$, $-R^2$, $-R^3$ and $-R^4$, independently of one another, are

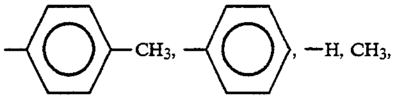

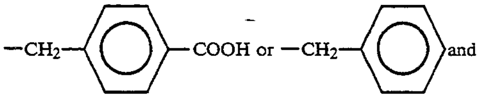

and p, q, r, s, independently of one another, are an integer of 2 to 4, $p+q+r+s$ being 8 to 16.

It is preferred to use an alignment layer which contains a compound of the formula (V) in which m, n are integers greater than zero and in which $m+n$ is 2 to 4, $-X^1-$, $-X^2-$, identical or different, are

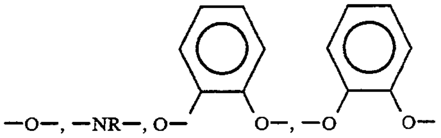

or $-X^1-$, $-X^2-$, identical or different, are $<N-CH_2(-CH_2-O-CH_2)_L-CH_2-N<$ in which —R is alkyl or alkanoyl of 1 to 15 carbon atoms, -phenyl, -benzyl or -benzoyl and L is 1 or 2.

It is also preferred to use a ferroelectric liquid crystal mixture which contains a compound of the formula (VI) in which $-R^1=-R^2=-R^3=-H$ and $-R^4$ is —H,

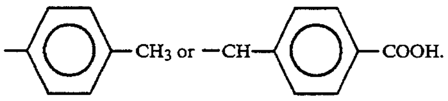

Mecapto compounds to be employed according to the invention are represented by the formula (VII) below (VII)

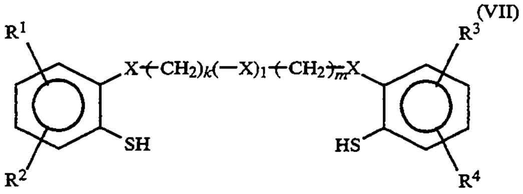

where $R^1$, $R^2$, $R^3$ and $R^4$, independently of one another, are an H atom, alkyl having 1 to 8 carbon atoms, or alkoxy having 1 to 8 carbon atoms —X— is —O—, —S— or —NH—, k and m, independently of one another, are 1, 2 or 3, and L is zero or 1.

In order to render the alignment layer amphiphilic, it is also possible to use the following methods instead of the addition of the abovementioned compounds to the alignment layer.

Compounds of the coronand and cryptand type also have hydrophilic (endosphere of the oxygen donor centers) and lipophilic (exosphere of the C—H units) properties. It is also possible to render alignment layers amphiphilic, and it is entirely possible for hydrophilic properties and lipophilic properties to be present at discrete locations.

Thus, for example, a polar polyvinylalcohol (DVA) can be provided with a partially hydrophilic and partially behaviour, and thus rendered amphiphilic, by treatment with lipophilic compounds or by linking (by covalent bonds) to lipophilic structures.

An analogous procedure is possible for lipophilic alignment layers and hydrophilic additives. An originally hydrophilic of lipophilic alignment layer can also be rendered amphiphilic by treatment with an amphiphilic compound or by chemically binding an amphiphilic compound to the alignment layer.

An alignment layer which has been rendered amphiphilic gives significantly increased contrast in the FLC display and greater image brightness.

Particularly suitable compounds which render the alignment layer amphiphilic are macrocyclic compounds cryptands, coronands, podands, mercapto compounds, ionophoric compounds and polymers containing rings, it being possible for these rings themselves to contain heretoatoms (O, S, N, etc.). An example of a ring-containing polymer is:

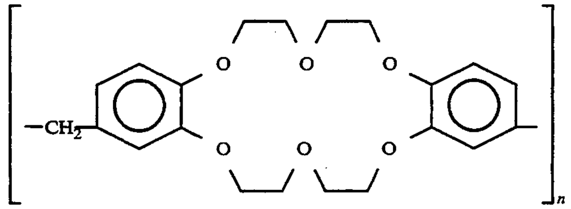

where n is 3 to 1,000.

Very generally, the following types of coupling to or in the alignment layer exist for the compounds mentioned.

Chemical coupling, i.e. the compound providing the amphiphilicity is preferably bonded to/in the alignment layer by covalent bonds. The compound to be bonded has the formula Cy—G—RG where:

Cy is one of the abovementioned amphiphilicity-providing compounds,

G is a straight-chain or branched alkylene unit having 0–18 carbon atoms, in which, in addition, one or more $—CH_2—$ groups may be replaced by

—O—, —S, —C(=O)—, —CO(=O)—, CH=CH—, —C≡C—,

—N(H)—, —N(SO₂R)—, —N(R)—SO₂— or $Si(CH_3)_2$ or is cycloalkanediyl, arenediyl or heteroarenediyl, it also being possible for one or more H atoms of the $—CH_2—$ groups to be replaced by F and Rg is a reactive group (coupling functionality), for example —OH, $—CO_2H$, $—CO_2R$, $—NH_2$, —NHR′, —SH,

—C(=O)—R′, —C(=O)—H,

—CN, —N=C=S, —N=C=O, $—CH=CH_2$, $—Si(CH_3)_2Cl$, $—Si(CH_3)_2OR'$, $—Si(OR)_3$, $—N_3$, halide, —N≡C or $—SO_2CH=CH_2$.

Preferred compounds are those in which Cy is one of the macrocycles, cryptands or coronands described above.

Very particular preference is given to compounds in which Cy has the following meaning:

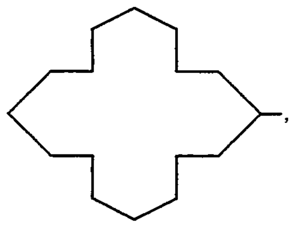

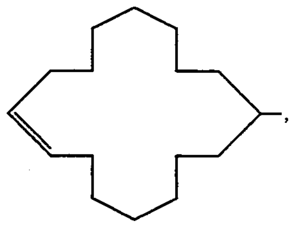

-continued
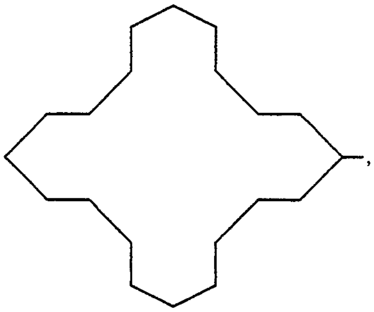
,
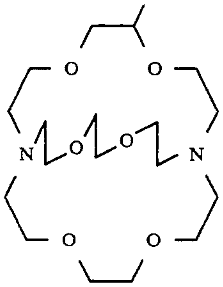
,
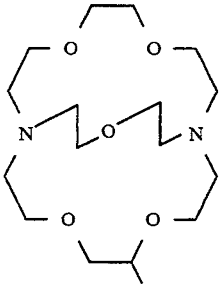
,
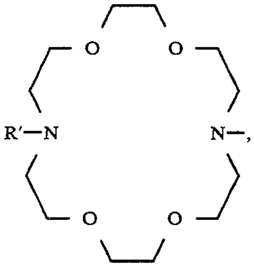
,
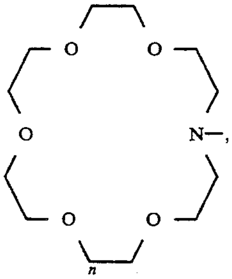
,
-continued
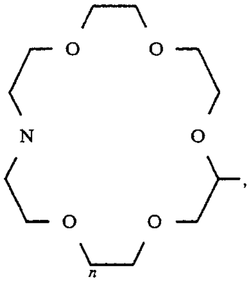
,
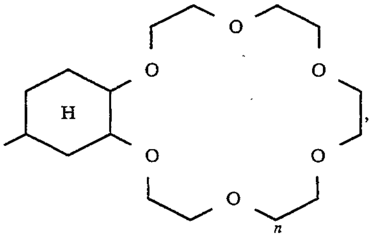
,
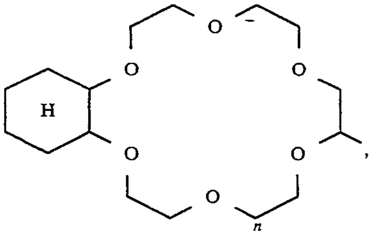
,
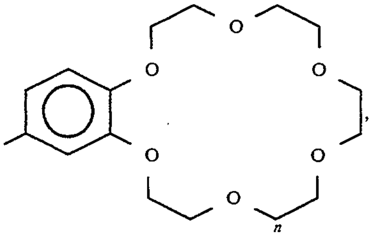
,
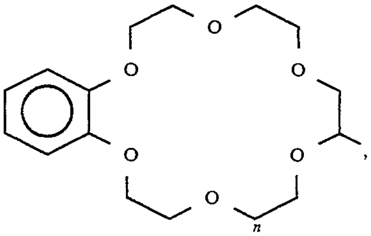
,
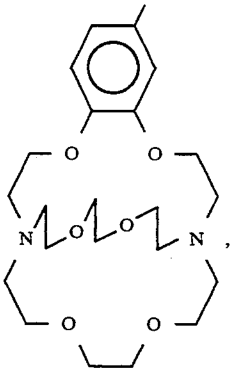
, -continued

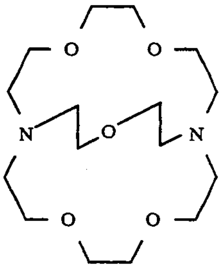
,

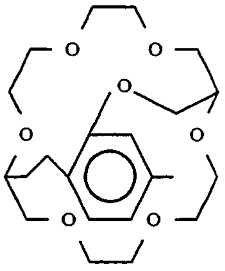

n is 0, 1 or 2.

Extremly preferred compounds are those in which Cy is:

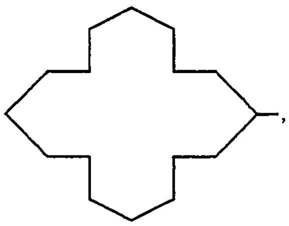
,

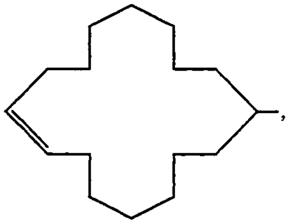
,

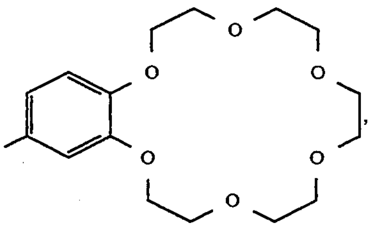
,

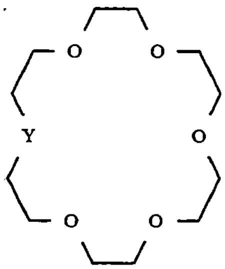
,

-continued

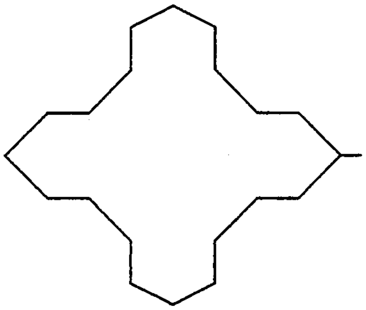

G is —O—(CH$_2$)m— or —(CH$_2$)m—,
Y is —O—, N-alkyl or N-aryl, and
Rg is —CO$_2$R, —N=C=O, —Si(CH$_3$)$_2$OR', —NH$_2$ or —OH.

II Physisorption

The compounds providing the amphiphilicity are held at the surface of the alignment layer molecules by weaker or stronger intermolecular attractive forces. The strength of the coupling to the surface can be increased by introducing polar or polarizable groups.

In the FLC displays according to the invention, a suitable substance (described in greater detail below) or a mixture of substances is applied to the alignment layer and, as a thin intermediate layer between the alignment layer and the ferroelectic liquid-crystal layer, affects the alignment and/or switching behaviour in such manner that the desired high contrast and brightness values can be achieved but without the need to choose the expensive SiO oblique vapor-deposition route.

The substances which are effective in this way can either be chemically bonded to the alignment layer or merely applied as a strongly or weakly physisorbed layer.

The component in the display which causes the amphiphilicity of the alignment layer can thus be applied as an additional layer between the alignment layer and the FLC layer, but may alternatively be added to the material of the alignment layer as a simple mixture component. A further possibility is to couple the substance to the material of the alignment layer of by a chemical reaction.

The effective intermediate layer can be applied, for example, from a solution of suitable compounds in acetone, toluene, cyclohexanone, isopropanol, N-methylpyrrolidone or the like by printing, immersion, spraying, spin-coating or the like. Vacuum deposition processes, such as simple vapor deposition or reactive vapor-deposition processes (such as, for example, "chemical vapor deposition (CVD)") are also suitable.

The effective intermediate layer can be applied at several stages in the FLC display production process, for example immediately after curing or drying of the alignment layer, before the rubbing step or just before the cell is bonded together. The substances or substance mixtures may likewise be applied to the wet film of the alignment layer and cured, i.e. heated, at the same time as the alignment layer.

It is also advantageous to mix the effective substances or substances mixtures into the polymer solution or polymer precursor solution made up for producing the alignment layer, and then apply them together with this solution in one step.

The effective compounds may in principle be either monomeric, oligomeric or polymeric compounds. In general, they have a moderate to highly lipophilic character with low polarity or have separate localized areas of high and low polarity/hydrophilicity. Cyclic compounds may also have an exosphere which tends to have a lipophilic nature and an endosphere with a fairly hydrophilic nature.

The type of compound which is suitable for rendering the alignment layer in the FLC display lipophilic or amphiphilic depends, inter alia, on the FLC medium empolyed and on the alignment layer.

The alignment layers may be any materials which can be conventionally be used, such as, for example, polyether ketones, polyamides, polyimides and polyvinyl alcohols, in particular those containing free functional groups, such as, for example, OH, ester, amino or carboxyl groups, and also siloxanes, oligomers or polymers containing SiO or Si units and electroconductive polymers.

Particularly suitable polyether ketones are the substances proposed in German Patent Application P 40 02 082.

They comprise at least one structural unit of the formula VIII $$—O—A—O—B— \quad (VIII)$$

where A is selected from the radicals $A^1$

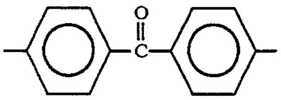

$A^2$

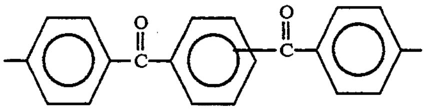

(m or p)

$A^3$

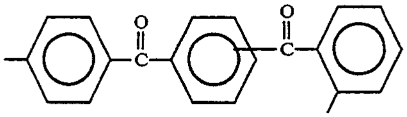

(m or p)

and B is selected from the radicals $B^1$

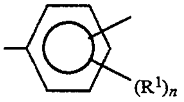

$B^2$

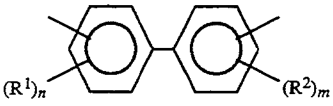

$B^3$

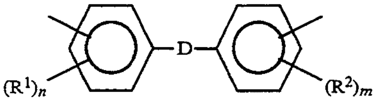

-continued $B^4$

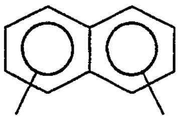

, $B^5$

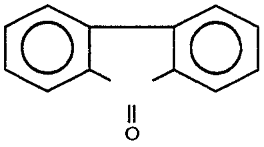

$B^6$

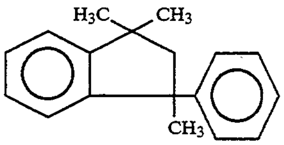

$B^7$

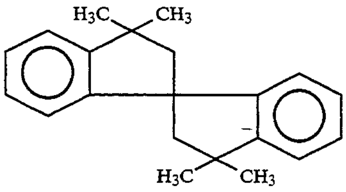

$B^8$

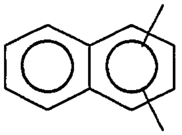

where $R^1$ and $R^2$ are identical or different and are hydrogen, halogen, preferably bromine, $(C_1–C_8)$-alkyl or -alkoxy, preferably $(C_1–C_4)$-alkyl or -alkoxy, or are aryl or arlyoxy having 6 to 12 carbon atoms in the aryl radical, m and n are identical or different and are zero or, as an integer, 1,2,3 or 4, preferably zero, 1 or 2, in particular zero or 2. If $R^1$ and $R^2$ in the radicals $B^2$ and $B^3$ are halogen, m and n are preferably 2. D is selected from the divalent radicals

| | |
|---|---|
| —O—, | $D^1$ |
| $>C=O$, | $D^2$ |
| $—CH_2—$, | $D^3$ |
| $—C(CH_3)_2—$, | $D^4$ |
| $—C(CF_3)_2—$, | $D^5$ |
| 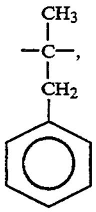 | $D^6$ |
| 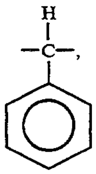 | $D^7$ |

-continued

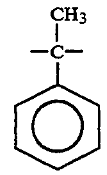

$D^8$

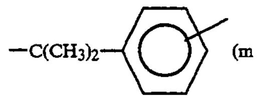

(m or p)

$D^9$

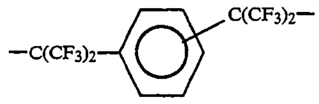

(m or p)

$D^{10}$ where the molar ratio between the units A und B is from 0.9 to 1.1:1.0, preferably 1:1.

The polymers mentioned may be homopolycondensates, i.e. contain only one unit of type A and one unit of type B per recurring unit, or copolycondensates which contain two or more different units of type A and/or two or more different units of type B.

Particularly suitable polyamides are the substances indicated in German Patent Applications P 38 33 180 and P 39 38 209. The compounds comprise structural units of the formula IX.

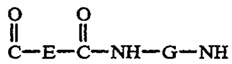

(IX)

where the units E and G have the following meanings:

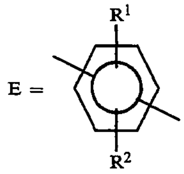

where $R^1$ and $R^2$ are identical or different and are H, ($C_1$-$C_8$)-alkyl, preferably ($C_4$-$C_6$)-alkyl, or ($C_1$-$C_6$)-alkoxy, preferably ($C_4$-$C_6$)-alkoxy, with the proviso that at least one of the radicals $R^1$ and $R^2$ contains a tertiary carbon atoms, preferably the $-C(CH_3)_3$ group, or

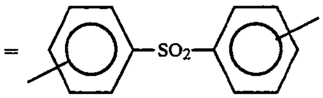

or

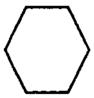

or

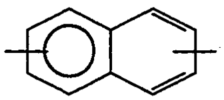

-continued

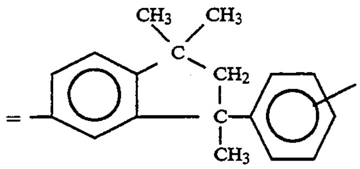

and

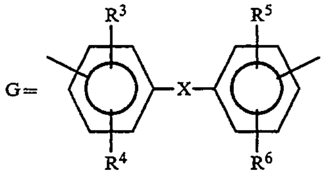

where and $R^3$, $R^4$, $R^5$ and $R^6$ are identical or different and are $-CH_3$, $-CF_3$, $-OCH_3$, —F, —C, —Br or —H, and X is —O—, $-C(CH_3)_2-$, $-C(CF_3)_2-$, $-SO_2$, —CO—, $-CH_2-$ or the radical

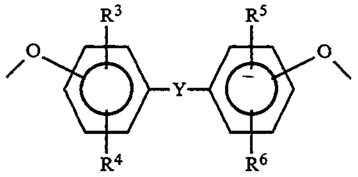

where $R^3$ to $R^6$ are as defined above and Y is $-C(CH_3)_2-$, $-C(CF_3)_2-$, $-SO_2$, —CO—, $-CH_2-$ or —O—, or

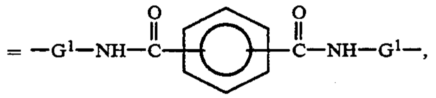

above for G.

The polymers according to the invention containing structural units of the formula IX may either be homocondensates wich contain only identical structural units of the formula IX or cocondensates comprising different structural units or the formula II. Preference is given to copolyamides which contain different structural units of the formula IX, preferably in a random distribution.

It is furthermore possible to employ polymers comprising cocondensates containing at least 10 mol-%, based on the polymer, of structural units of the formula IX, which may be identical or different, and structural units of the formula X

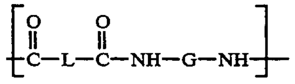

X in which L is

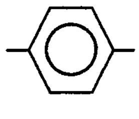

or

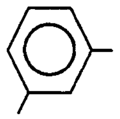

or

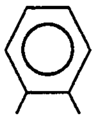

and G is as defined for the formula IX.

The molar ratio between the structural units of the formulae II and III in the copolyamides, preferably with a random distribution of the structural units, is preferably in the range from 1:9 to 9.5:0.5, in particular from 1:9 to 1:8.

As a measure of the molecular weight of the polymer, the limiting viscosity [$\eta$], which can be determined by known measurement methods on solutions of the polymers, can be employed. The limiting viscosity [$\eta$]of the polyamides or copolyamides according to the invention can be varied within a broad range. It is preferably from 0.2 to 5 dl/g, in particular from 0.4 to 4.2 dl/g, measured in N-methylpyrrolidone (NMP) solution at 25° C.

It is furthermore possible for the alignment layer to comprise aromatic polyamides containing structural units of the formula XI.

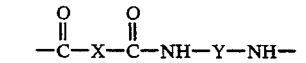

(XI)

where the symbols have the following meanings:

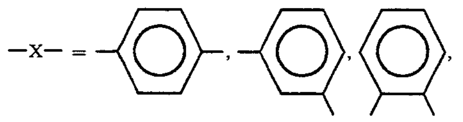

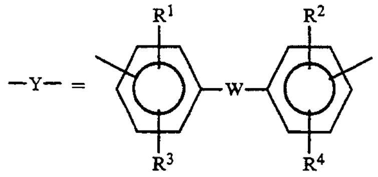

where $R^1$ and $R^2$ are identical or different and are perfluorinated alkyl having 1 to 4 carbon atoms, $R^3$ and $R^4$ are identical or different and are H or $CF_3$, and —W— is —O—, $C(CH_3)_2$—, —$C(CF_3)_2$—, $SO_2$—, —CO— —$CH_2$—, a single bond or the radical

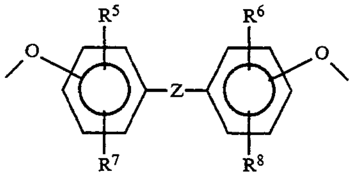

where $R^5$, $R^6$, $R^7$ $R^8$ are identical or different and are $CH_3$, $CF_3$, $OCH_3$, F, Cl, Br or H, and —Z—is —$C(CH_3)_2$—, —$C(CF_3)_2$— —$SO_2$—, —CO—, —$CH_2$— or —O—.

The group —X— may additionally be one of a wide range of other divalent groups since the dicarboxylic acid component may also be, for example, 1,4-cyclohexanedicarboxylic acid or a pyridinedicarboxylic acid.

Particularly suitable polyimides are fluorinated polyimides and those containing free functional groups, such as, for example, OH, ester, amino or carboxyl groups.

Preferred electroconductive polymers are compounds of EP-A 412 408 containing recurring structural units of the formula XII.

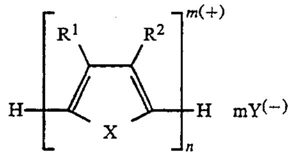

XII where $R^1$ and $R^2$, independently of one another, are H or straight-chain or branched alkyl or alkoxy having 1–16 carbon atoms, or halogen, X is S or NH $Y^-$ is $BF_4^-$, $PF_6^-$, $PO_4^{3-}$, $AsF_6^-$, $SbCl_6^-$, $SO_4^{2-}$, $HSO_4^-$, alkyl-$SO_3^-$, perfluoroalkyl-$SO_3^-$, aryl-$SO_3^-$, $F^-$ or $Cl^-$, n is an integer from 4 to 100, and m is an integer from I to 30.

The alignment layer employed preferably contains a polyimide, polyamide or polyvinyl alcohol (PVA) as the base component. In this case, the alignment layer preferably contains from 50 to 99.99% by weight of the polyimide, polyamide or PVA and a total of from 0.01 to 50% by weight of one or more of the effective compounds. Materials which are generally suitable for alignment layers, such as polyamides, polyimides and PVAs, are described, for example, by Birendra Bahadur in Mol. Cryst. Liq. Cryst. 109,I (1984).

In a preferred embodiment, insulation layers are used to prevent short-circuits, with the layer sequence being (1) glass, (2) ITO electrode, (3) insulation layer, (4) alignment layer with additive mixed in or chemically or physically bonded to the surface.

In order to suppress the above-described "surface memory effect", the electrical capacitance of the insulation and alignment layers should be as high as possible (cf. in this respect C. Escher, H. -R. Dübal, T. Harada, G. Illian, M. Murakami and D. Ohlendorf, 2nd Int. Symp. on FLC, Gothenburg, 1989, published in Ferroelectrics).

For adequate insulation, the thickness of the insulation layer should be at least 50-100 mn. In order to achieve a sufficiently high capacitance at this thickness, insulation layer having high dielectric constants, such as, for example $Ta_2O_5$, $TiO_2$, etc., must be used (see also JP 61/170 726A, JP 61/078 235A, Y. Inabe, K. Katagiri, H. Inone, J. Kanbe, S. Yoshihara and S. Iijima, Ferroelectrics (1988) 85, pp. 255–264).

The positive effect of the compounds providing the lipophilicity or amphiphilicity of the alignment layer is significantly increased by liquid-crystal mixtures which likewise contain these compounds, in particular coronands and cryptands.

In the displays, the alignment layer treated according to the invention has the effect, in particular, of suppressing twist states and ghost images and thus improving the optical contrast.

Furthermore, the lipophilic or amphiphilic alignment layer can be used to produce a highly shock stable liquid-crystal switching and display device, By adding the compounds to be employed according to the invention, in particular coronands and cryptands, to alignment layers, the FLC mixtures can be converted into a uniform and twist-free "bookshelf" or "quasi-bookshelf" alignment by applying a continuous periodic electrical voltage {explanation of terms: Dübal et al., Proc. 6th Intl. Symp. on Electrets, Oxford, England (1988). Y. Sato et al., Jap. J. Appl. Phys. 28, L 483 (1989)). The angle of the quasi-bookshelf geometry of the smectic layer is usually less than 10°, determined by X-ray diffraction measurement. After addition of square voltage of low frequency and a high electric field, the angle becomes smaller, and the structure becomes close to the bookshelf geometry. On the other hand, the angle of a smectic layer of chevron geometry is about 20° without square voltage for changing quasi-bookshelf geometry. Shock-damaged liquid-crystal displays can be regenerated if the amphiphilicity-providing substances are used in alignment layers by applying continuous periodic voltage, as has already been proposed in connection with the use of these substances in FLC mixtures (German Patent Application P 40 11 805).

EXAMPLE

The compounds (Compounds 1 to 9) used for the following examples are:

The FLC mixtures (Mixtures 1 and 2) used for the following examples are:

Mixture 1

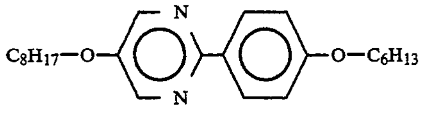 29.80%

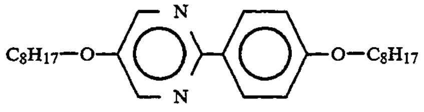 13.75%

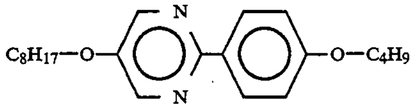 31.43%

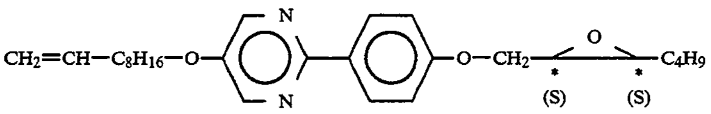

Compound 1

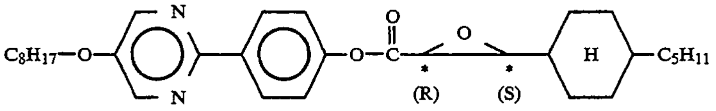

Compound 2

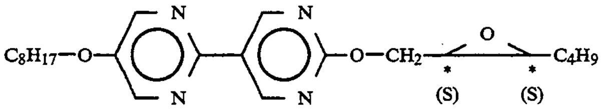

Compound 3

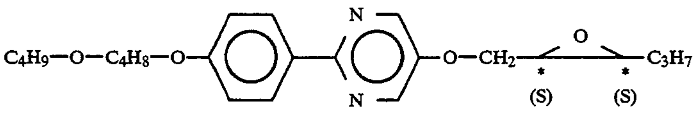

Compound 4

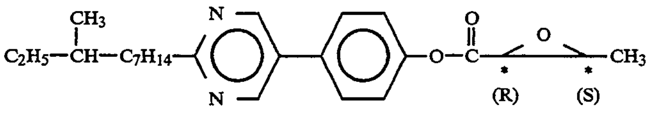

Compound 5

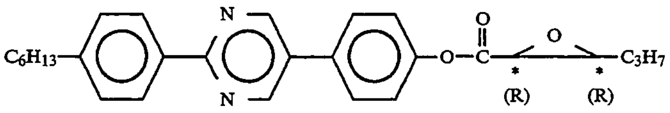

Compound 6

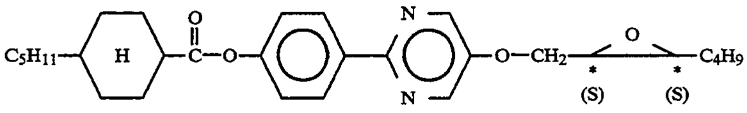

Compound 7

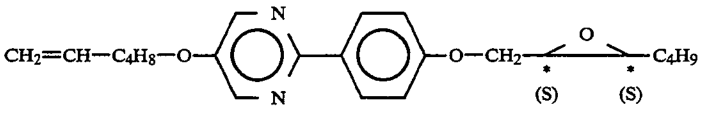

Compound 8

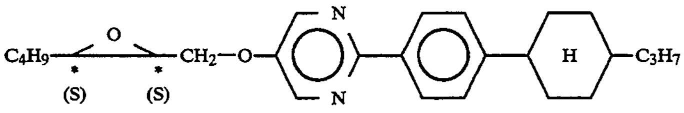

Compound 9

-continued

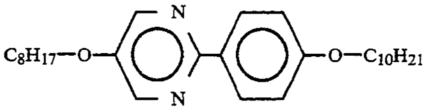 24.99%

Mixture 2

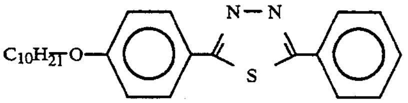 50 mol %

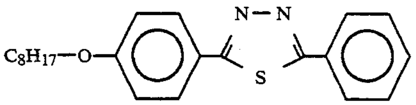 50 mol %

The additives (Additives 1 to 3) used for the following examples are:

Additive 1

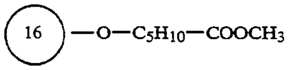

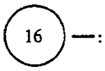: cyclohexyldecanyl group

Additive 2

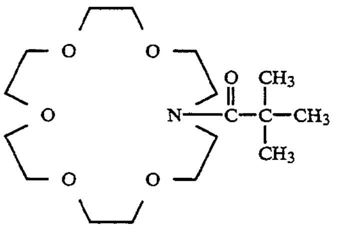

Additive 3

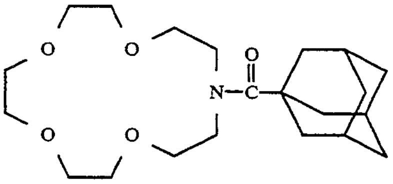

Example 1

An FLC mixture of the following components was prepared. This mixture did not contain lipophilic or amphiphilic compounds

| | |
|---|---|
| Compound 9 | 21% |
| Compound 1 | 7% |
| Compound 6 | 3% |
| Mixture 1 | 69% |

PVA alignment layers containing Additive 1 were formed in a thickness of about 150 Å onto two glass substrates with transparent electrodes. The alignment layers were rubbed on one side by a roll rubbing method, then the two substrates were attached together so that the alignment layers faced inside, to form a test cell. After being filled with the above FLC mixture at isotropic condition (about 100° C.), the cell was cooled down to room temperature. A square pulse of ±35 V, 10 Hz was addressed to the cell in order to change the smectic layer structure into a bookshelf geometry, and an effective switching angle and CPA was measured. CPA represents a product of a pulse width and a minimum field strength in which the liquid crystal molecules can switch completely, when liquid crystal molecules are switched by pulse addressing under a constant pulse width an increasing electric field. The result was as follows.

$2\theta eff=54°$

CPA=800(at 25° C.)

The cell was multiplexable with a bias=4.

Example 2

PVA alignment layers containing Additive 1 were rubbed at parallel direction on both sides. The cell was formed using the alignment layers, and filled with the FLC mixture of the Example 1. The switching properties of the cell were measured according to the method described in Example 1, and are summarized below.

$2\theta eff=54°$

CPA=800(at 25° C.)

Contrast=30

The cell was mutiplexable with a bias=6.

Example 3

An FLC mixture M1 of the following component was prepared.

| | |
|---|---|
| Compound 1 | 27% |
| Compound 2 | 28% |
| Compound 3 | 18% |
| Compound 4 | 27% |

An FLC mixture M2 of the following component was prepared.

| | |
|---|---|
| Compound 1 | 26.73% |
| Compound 2 | 27.72% |
| Compound 3 | 17.82% |
| Compound 4 | 26.73% |
| Additive 2 | 1% |

An FLC mixture M3 of the following component was prepared.

| | |
|---|---|
| Compound 1 | 28.95% |
| Compound 2 | 19.3% |
| Compound 3 | 19.3% |
| Compound 6 | 3.5% |
| Compound 4 | 28.95% |

An FLC mixture M4 of the following component was prepared.

| | |
|---|---|
| Compound 1 | 13.72% |
| Compound 2 | 9.15% |

-continued

| | |
|---|---|
| Compound 3 | 9.15% |
| Compound 6 | 1.66% |
| Compound 4 | 13.72% |
| Mixture 1 | 52.6% |

An FLC mixture M5 of the following component was prepared.

| | |
|---|---|
| Compound 1 | 22.95% |
| Compound 2 | 23.8% |
| Compound 3 | 15.3% |
| Compound 4 | 22.95% |
| Additive 2 | 0.85% |
| Mixture 2 | 15% |

Liquid crystal test cells with alignment layers containing Additive 3 were rubbed on both side as described in Example 1. The cells were filled with the FLC mixtures M1 to M5. The switching properties of the cells were measured according to the method described in Example 1, and are summarized in Table 1.

TABLE 1

| Mixture | Phase Sequence (°C.) | Sc* Pitch (μm)(25° C.) | Ps(nC · cm$^{-2}$) (25° C.) | CPA (25° C.) | 2 θ eff(°) dyn | stat |
|---|---|---|---|---|---|---|
| M1 | Sc* 77 SA* 96 N* 103 I | 0.255 | 129 | 900 | — | 54 |
| M2 | Sc* 72 SA* 93 N* 102 I | 0.256 | — | 950 | 48 | — |
| M3 | Sc* 77 SA* 98 N* 100 I | 0.271 | 190 | 880 | 50 | 55 |
| M4 | Sc* 76 SA* 95 N* 99 I | −0.625 | 59 | 980 | 48 | 48 |
| M5 | Sc* 78 SA* 93 N* 103 I | 0.286 | — | — | 43 | 44 |

On the other hand, the cells having a conventional alignment layers without any additives were filled with any of the FLC mixtures from M1 to M5. These cells did not switch at all, mainly because of the surface memory effects.

As shown in the above examples, liquid crystal displays having a significantly improved switching properties were provided by using FLC mixtures having a short helical pitch and a high spontaneous polarization, together with an alignment layer containing lipophilic or amphiphilic compounds.

We claim:

1. Ferroelectric liquid crystal display comprising outer substrates, of which at least one is transparent, electrodes, of which at least one is transparent, polarizer(s), ferroelectric liquid crystalline material and alignment layer(s), in which said ferroelectric crystalline material has a spontaneous polarization of Ps>20 nC.cm$^{-2}$ and a natural helical pitch of less than half of the cell thickness, and, said alignment layer comprises at least one lipophilizing, lipophilic and/or amphiphilic compound.

2. Liquid crystal display as claimed in claim 1, in which said helical pitch is less than 1 μm.

3. Liquid crystal display as claimed in claim 1, in which said ferroelectric liquid crystalline material comprises at least one lipophilic and/or amphiphilic compound.

4. Liquid crystal display as claimed in claim 1, in which the structure of the smectic layer of said ferroelectric liquid crystalline material is a bookshelf geometry or a quasi-bookshelf geometry.

5. Liquid crystal display as claimed in claim 4, in which said bookshelf geometry or quasi-bookshelf geometry is formed by an electric field treatment.

6. Liquid crystal display as claimed in claim 4, in which the tilt angle of said bookshelf geometry or quasi-bookshelf geometry is less than 10°.

* * * * *